Patented Mar. 25, 1952

2,590,566

UNITED STATES PATENT OFFICE 2,590,566

HYDROTHERMAL SYNTHESIS OF FORSTERITE

Elburt F. Osborn, State College, Pa., assignor to Harbison-Walker Refractories Company, Pittsburgh, Pa., a corporation of Pennsylvania Application June 22, 1949, Serial No. 100,698

9 Claims. (Cl. 23—110)

During recent years forsterite ($2MgO.SiO_2$) has become one of the major basic refractory materials, due in large part to the very high melting point of the pure mineral, about 1900° C. Olivine rock has been used extensively as a source of raw material in the manufacture of forsterite brick because of its ready availability in large tonnages. Such brick when made properly afford excellent service under various conditions. However, when exposed alternately to oxidizing and reducing atmospheres at elevated temperatures, forsterite brick made from olivine and brick made from other basic refractories tend to fail by general disintegration. This has been attributed to the presence of certain impurities in olivine that undergo chemical change under the conditions named. The objectionable disintegration might, therefore, be avoided by the use of materials free from such impurities, but owing to the absence of material of such purity in nature that would necessitate the synthesis of forsterite.

Forsterite can be formed by heating dry mixtures of magnesia (MgO) and silica ($SiO_2$) but the rate of reaction is exceedingly slow at temperatures below about 1400° C., and it proceeds at a reasonable rate only at about 1600° to 1900° C.

The primary object of the present invention is to provide a simple, easily performed and efficient method of producing forsterite by hydrothermal synthesis, which makes use of readily available materials, which can be carried out at acceptably fast rates at relatively low temperatures, and which is applicable to the production of forsterite in a state of very high purity.

Figure 1:
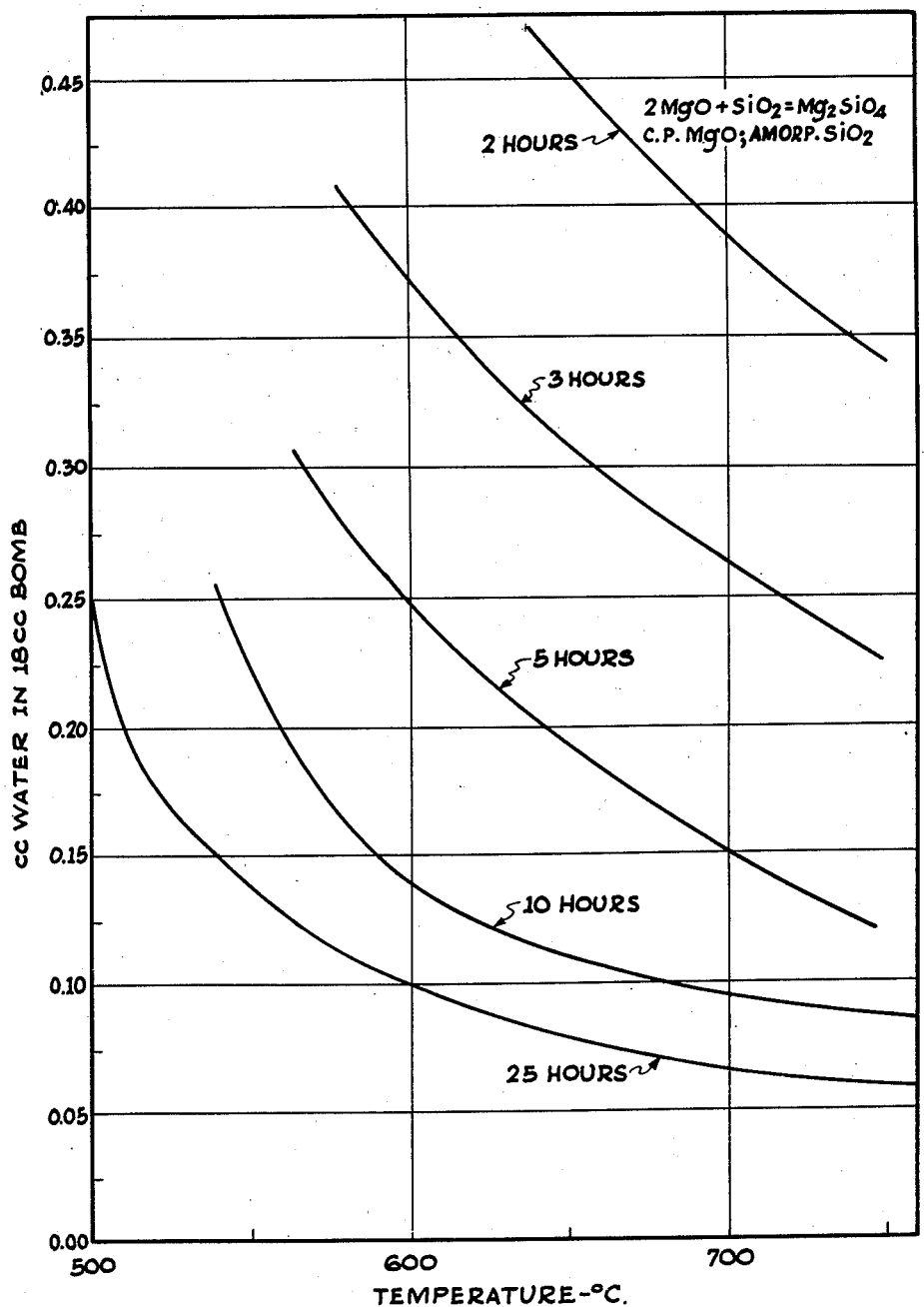
Figure 2:
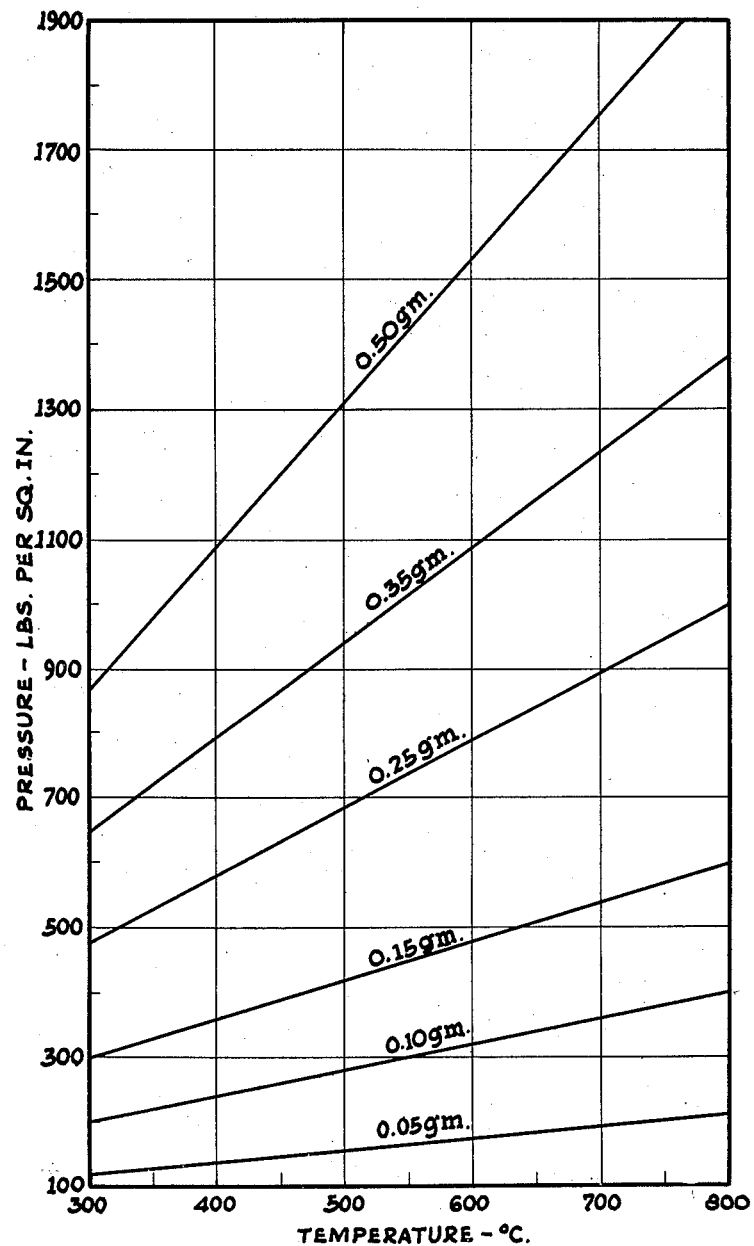

The invention will be described with reference to the accompanying drawings in which Fig. 1 is a series of graphs, based upon actual practice of the invention, correlating the effect of steam pressure and temperature upon the time necessary for complete conversion of magnesia and silica to forsterite; and Fig. 2 a series of graphs representing the steam pressure at various temperatures corresponding to specified amounts of water, based upon the data of Keyes and Keene.

I have discovered, and it is upon this that the invention is in large part predicated, that forsterite can be produced at commercially desirable reaction rates and at commercially feasible temperatures and pressures by heating magnesia and silica in a closed system, or pressure chamber, in the presence of steam, or water vapor.

Magnesia of various origins has been used in the practice of the invention. I have found that MgO of C. P. grade yields excellent results, from the standpoint of the rapidity of reaction and purity of product. However, substantially the same reaction rate, with a given silica, is to be had by the use of commercial lightly-calcined magnesia, e. g., magnesia produced by the calcination of magnesium hydroxide at about 800° to 1200° C. The magnesia might be supplied in the form of dead burned magnesite but its reaction rate is much slower and therefore it is now preferred to use magnesia in the lightly-calcined or C. P. grades. I have found also that such magnesian rocks as dolomite likewise afford satisfactory results in the practice of the invention. All such materials may be considered as magnesia or magnesium carbonate.

Silica of various sources has likewise been used satisfactorily, e. g., ignited silicic acid (amorphous silica) and finely divided quartz. As in the case of dead burned magnesite, the use of quartz results in longer reaction time than when the silica is supplied as ignited silicic acid. Such magnesium silicates as serpentine also satisfactorily operate to supply silica for the reaction. The materials supplying silica for the reaction are, of course, silica and silicates.

Rapidity of reaction is, of course, desirable for obvious reasons, and the reaction rate is affected by several variables, as would be expected. For example, the reactants should be finely divided because I find that the finer the particle size the more rapid is the conversion to forsterite. In most instances the reactants should be at least of minus 200-mesh fineness, and most suitably they should pass a 325-mesh sieve. Other primary factors are the steam pressure and temperature. The higher the pressure at a given temperature, the shorter the reaction time will be. Likewise, an increase in temperature for any one pressure results in increased reaction rate. Also, my tests have shown that the greater the amount of reactant material in a reaction chamber of given volume, the longer will be the reaction time. And, as indicated above, reaction time will be affected also by the origin or physical state of the reactants.

Many tests have shown that using magnesia-material and silica-material, both finely divided, and most suitably to pass a 325-mesh sieve, forsterite can be produced at a satisfactorily rapid rate. At temperatures below about 500° C. the reaction is not sufficiently rapid to be economically desirable, although it is perfectly feasible. On the other hand, temperatures above about 700° C. are not practical because of limitations of the high pressure equipment now available, although higher temperatures are productive of still more rapid reaction. However, between those two temperatures the rate of reaction is sufficiently rapid to be economically desirable. Satisfactorily rapid reaction may be had at 600° C. under a steam pressure of 500 p. s. i., or at 700° C. and a steam pressure of 350 p. s. i. Equipment is available for operating under such conditions.

The forsterite produced hydrothermally in this manner is extremely fine grained, the particles being of about one micron size. Of course, if the reactants are pure, the forsterite is likewise of high purity. Compacting of the finely divided starting materials appears to have little effect upon the rate of reaction, and within the limit of my experience it does not result in a consolidated forsterite, which appears to be finely subdivided even with strong pelleting of the starting mixture of silica and magnesia.

The product is adapted to be used as a bond material for basic refractories, e. g., for chrome-magnesia brick, for the production of either burned or chemically bonded forsterite brick, as a source for dense, high purity forsterite grain, and for related refractory purposes.

The practice of the invention may be exemplified by reference to some of the actual tests that have been made of the process. In those tests there was used a Morey type high pressure vessel made from stainless steel and having a closed chamber of 18 cc. volume. Weighed amounts of the dried starting materials were sealed in the bomb, together with a measured volume of water, and the bomb was then placed in a furnace that was held at constant temperature for the desired time. The graphs of Fig. 2 show the steam pressures developed in the 18 cc. bomb at various temperatures by the amounts of water when indicated on the several graphs.

Tests were carried out at different pressures and temperatures for various times, and the percentage of forsterite in the reaction product was determined. This was accomplished by first determining the X-ray patterns of mixtures throughout the ternary system, silica-forsterite-magnesia. The standard patterns thus obtained were then used for comparison with the X-ray patterns of the individual reaction products.

The data obtained in this way in a long series of tests are plotted in Fig. 1, in which the individual curves represent, as shown, the time in hours necessary for complete conversion of the reactants to forsterite. In this seres of tests there was used a 1.25 gram sample of C. P. MgO and ignited silicic acid, both passing a 325-mesh sieve, in amounts corresponding to forsterite. From these curves there can be determined, for such starting material, the temperature and pressure needed to effect complete conversion to forsterite in a given length of time. For example, complete conversion in five hours at 700° C. results when the pressure is that produced by 0.15 gram of water in the 18 cc. bomb, which by reference to Fig. 2 is shown to produce a steam pressure of 540 pounds p. s. i. Or, to produce complete conversion in the same length of time at 600° C. would require the higher pressure developed by 0.25 gram of water and which by reference to Fig. 2 produces a steam pressure of 790 p. s. i. The other graphs can be used likewise. For instance, if a 10-hour operating cycle would be acceptable, complete conversion of C. P. MgO and amorphous silica would be had at the following temperatures and pressures, from the 10-hour curve:

| Temp.—°C. | Press.—p. s. i. |
| --- | --- |
| 540 | 730 |
| 590 | 470 |
| 680 | 360 |

Again, conversion of C. P. MgO and amorphous silica would be complete in two hours at 740° C. and 1300 p. s. i.

Standard steam tables, such as those of Keyes and Keene, are applicable for determining the mass of water needed to develop a given pressure at a given temperature for reaction chambers of other sizes. Of course, other types of closed system than that just exemplified may be used, and may be desirable, e. g., a closed system in which the pressure is supplied by a pump.

Graphs similar to Fig. 1 have been developed from other source materials, such as C. P. magnesia and quartz. Using the same bomb and the same size sample, I have found, for example, that high purity quartz and MgO (C. P.), both passing a 325-mesh sieve, will be completely converted to forsterite in four hours at a temperature of 600° C. and a steam pressure of 1080 p. s. i. Experience has shown also, as indicated above, that mixtures of serpentine and magnesia, or of dolomite and silica, may be converted to forsterite by the hydrothermal procedure of this invention. An interesting aspect of the use of dolomite as a source of magnesia is that the product is forsterite and calcite; the two substances may be separated and recovered by various procedures, as by sink-float methods, flotation, and others.

Of course it is preferable for some purposes to mix the reactants in proportions corresponding stoichiometrically to forsterite. That is not essential, however, where pure forsterite is not needed, or where the pure silicate can be separated economically from unreacted material. For example, for producing forsterite bond material for making magnesite refractories, or chrome-magnesite refractories, an excess of magnesia would not be objectionable.

According to the provisions of the patent statutes, I have explained the principle and mode of practicing my invention and have illustrated and described what I now consider to represent its best embodiment. However, I desire to have it understood that, within the scope of the appended claims, the invention may be practiced otherwise than as specifically illustrated and described.

I claim:

1. That method of synthesizing forsterite hydrothermally that comprises heating a mixture of a finely divided material containing a compound chosen from the group consisting of magnesia and magnesium carbonate and finely divided material containing a compound chosen from the group consisting of silica and silicates to at least about 500° C. in a closed system in the presence of water vapor under a pressure of at least about 350 pounds per square inch.

2. A method according to claim 1, the magnesia being supplied as lightly calcined magnesia.

3. A method according to claim 1, the silica being supplied as amorphous silica.

4. A method according to claim 1, the magnesia being supplied as lightly calcined magnesia, and the silica being supplied as amorphous silica.

5. A method according to claim 1, said silicate being serpentine.

6. A method according to claim 1, said magnesium carbonate being supplied as dolomite.

7. That method of synthesizing forsterite hydrothermally that comprises heating a mixture of a material containing a compound chosen from the group consisting of magnesia and magnesium carbonate and material containing a compound chosen from the group consisting of silica and silicates, both of at least 200-mesh fineness, to a temperature between 600° and 700° C. in a pressure chamber in the presence of water vapor under a pressure between 500 and 350 pounds per square inch.

8. A method according to claim 7, said magnesia being supplied as lightly calcined magnesia, said silica being supplied as amorphous silica, and said magnesia and silica passing a 325-mesh sieve.

9. That method of synthesizing forsterite hydrothermally that comprises heating a mixture of a finely divided material containing a compound chosen from the group consisting of magnesia and magnesium carbonate and finely divided material containing a compound chosen from the group consisting of silica and silicates in proportions corresponding to forsterite, to at least about 500° C. in a pressure chamber in the presence of water vapor under a pressure of at least 350 pounds per square inch.

ELBURT F. OSBORN.

REFERENCES CITED

The following references are of record in the file of this patent:

UNITED STATES PATENTS

| Number | Name | Date |
|---|---|---|
| 2,203,614 | Goodwin | June 4, 1940 |
| 2,343,151 | McIntyre | Feb. 29, 1944 |

FOREIGN PATENTS

| Number | Country | Date |
|---|---|---|
| 602,453 | Great Britain | May 27, 1948 |

OTHER REFERENCES

Dana, "A Textbook of Mineralogy," 4th ed. (1932), revised by W. E. Ford, page 676. New York, John Wiley & Sons.